United States Patent [19]
Gamache et al.

[11] Patent Number: 5,202,991
[45] Date of Patent: Apr. 13, 1993

[54] REDUCING THE EFFECT PROCESSOR BLOCKING

[75] Inventors: Rodney N. Gamache, Merrimac; Stuart J. Farnham, Mason; Michael S. Harvey, Nashua, all of N.H.

[73] Assignee: Digital Equipment Corporation, Maynard, Mass.

[21] Appl. No.: 655,180

[22] Filed: Feb. 13, 1991

Related U.S. Application Data

[63] Continuation of Ser. No. 540,886, Jun. 20, 1990, abandoned, which is a continuation of Ser. No. 181,637, Apr. 14, 1988, abandoned.

[51] Int. Cl.⁵ .............................................. G06F 9/00
[52] U.S. Cl. .................................. 395/650; 364/281.3
[58] Field of Search ........................... 395/650, 725; 364/DIG. 1 MS File, DIG. 2 MS File

[56] References Cited

U.S. PATENT DOCUMENTS

| | | | |
|---|---|---|---|
| 3,618,045 | 11/1971 | Campbell | 364/200 |
| 4,001,783 | 1/1977 | Monahan et al. | 364/200 |
| 4,084,228 | 4/1978 | Dufond et al. | 364/200 |
| 4,228,495 | 10/1980 | Bernhard et al. | 364/200 |
| 4,394,727 | 7/1983 | Hoffman et al. | 364/200 |
| 4,394,730 | 7/1983 | Suzuki et al. | 364/200 |
| 4,493,036 | 1/1985 | Boudreau et al. | 364/200 |

OTHER PUBLICATIONS

ICC '79 Conference Record, pp. 21.6.1–21.6.5 Jun. 1979.
IBM Technical Bulletin, vol. 26, No. 6 Nov. 1983.
IBM Technical Bulletin, vol. 22, No. 6 Nov. 1979.

Primary Examiner—David Y. Eng
Attorney, Agent, or Firm—Fish & Richardson

[57] ABSTRACT

The supply of available tasks that may be executed by a blocked processor while it is waiting for the end of a conflict with another processor, is controlled by temporarily lowering the interrupt priority to a minimum level above which it will be permitted to accept other tasks for execution.

7 Claims, 2 Drawing Sheets

REDUCING THE EFFECT PROCESSOR BLOCKING

This is a continuation of copending application Ser. No. 07/540,886 filed on Jun. 20, 1990, now abandoned, which is a continuation of Ser. No. 7/181,637, filed on Apr. 14, 1988 now abandoned.

BACKGROUND OF THE INVENTION

This invention relates to controlling the supply of available tasks that may be executed by a processor when its work has been temporarily blocked by a conflict with another processor.

Such blocking may happen, for example, when one processor attempts to enter a critical region of code where the other processor is working. (Critical regions are set up to protect data stored in a shared memory against conflicting accesses by two or more processors.) Typically the critical region is protected by a flag in shared memory that is set when a processor is working in the region, and otherwise is cleared. A processor always checks the flag before entering the region, and if it finds the flag set, waits until the other processor has left the region.

In some systems, the waiting processor is assigned to work on other tasks until the critical region becomes free. Switching to such other tasks wastes time because current context information must be stored and recovered again each time another task is done.

Another known approach takes advantage of the fact that in some computers (e.g., Digital Equipment Corporation's VAX) each task is assigned one of, e.g., 32 interrupt priority levels that are ranked according to their relative urgencies and the relative overhead costs of executing them. Generally, when a processor is blocked from working in a critical region having a given interrupt priority level, the blocked processor may service only other tasks having higher interrupt priority levels.

SUMMARY OF THE INVENTION

A general feature of the invention increases the supply of available tasks that may be executed by the blocked processor while it is waiting, by temporarily lowering the interrupt priority to a minimum level above which it will be permitted to accept tasks for execution.

Preferred embodiments of the invention include the following features. When the conflict arises as a result of one processor being blocked from a critical region of code in which another processor is working, the priority level of the blocked processor is lowered below the priority level of the critical region, but not lower than some predetermined priority level (based on the context switching overhead incurred for different priority levels), nor lower than the priority level that the blocked processor had before the conflict arose.

As a result, the blocked processor may be able to perform more tasks while waiting for the conflict to end, without incurring unreasonable amounts of context switching overhead, and without being directed to tasks at priority levels that are lower than the original priority level of the blocked processor. This scheme is easy to implement and flexible in its application.

Other advantages and features will become apparent from the following description of the preferred embodiment, and from the claims.

DESCRIPTION OF THE PREFERRED EMBODIMENT

We first briefly describe the drawings.

STRUCTURE

Figure 1:
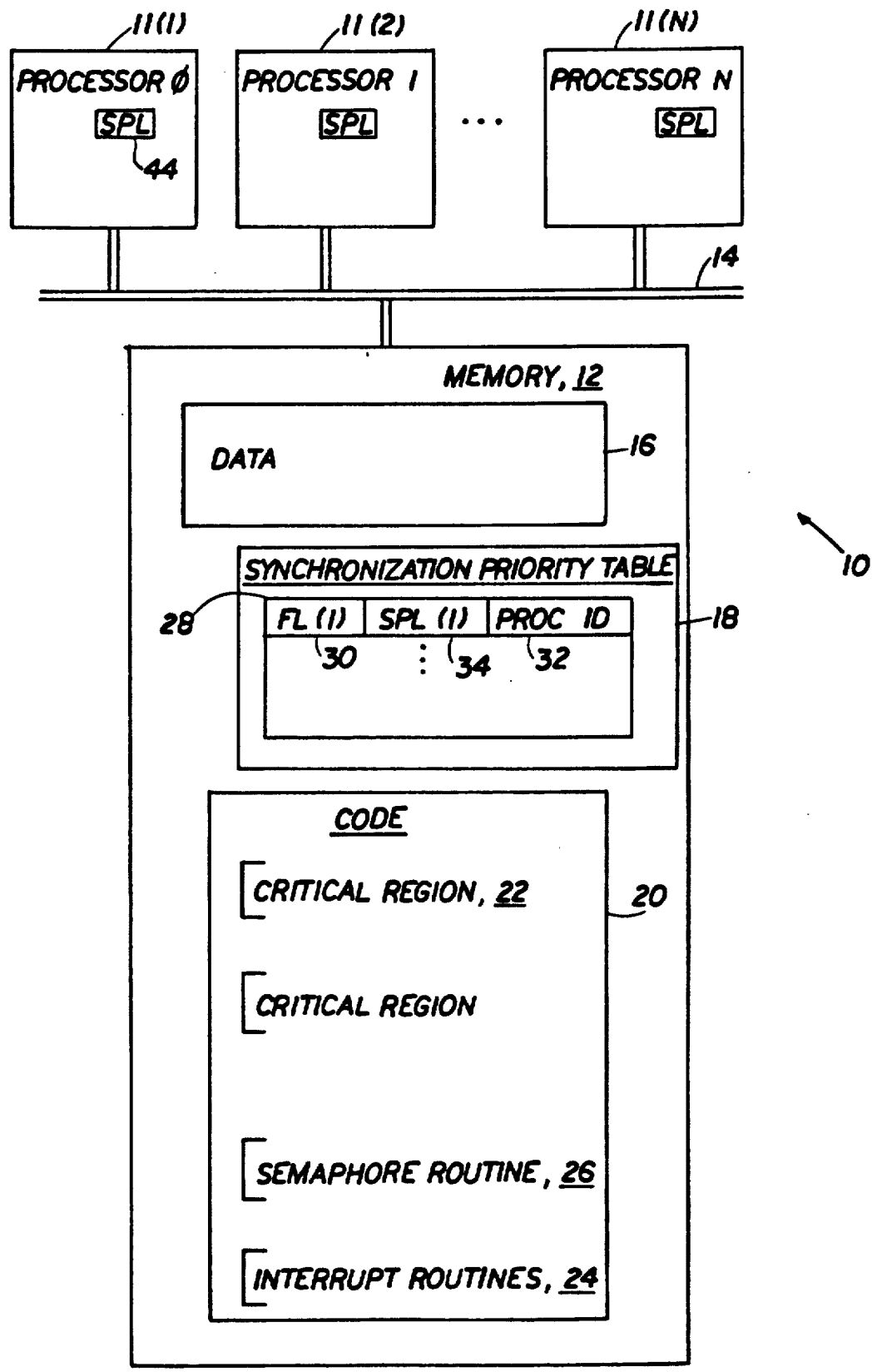
FIG. 1 is a block diagram of a portion of a multiple processor computer.

Referring to FIG. 1, in a symmetrical multiple processor (SMP) system 10, a number (N) of processors 11 (1) through 11 (N) share a common memory 12 via a bus 14. Stored in memory 12 are, among other things, data 16, a synchronization priority table 18, and operating system and application code 20 (including critical regions 22, various interrupt tasks 24, and a semaphore routine 26).

Each entry 28 in the synchronization priority table corresponds to one of the critical regions and serves to prevent more than one processor from entering the corresponding critical region. A flag field 30 (FL) indicates whether a processor is operating in the critical region. If so, that processor is identified in the PROC ID field 32. A synchronization priority level (SPL) field 34 contains a value corresponding to the interrupt priority level of the critical region associated with the table entry.

Figure 2:
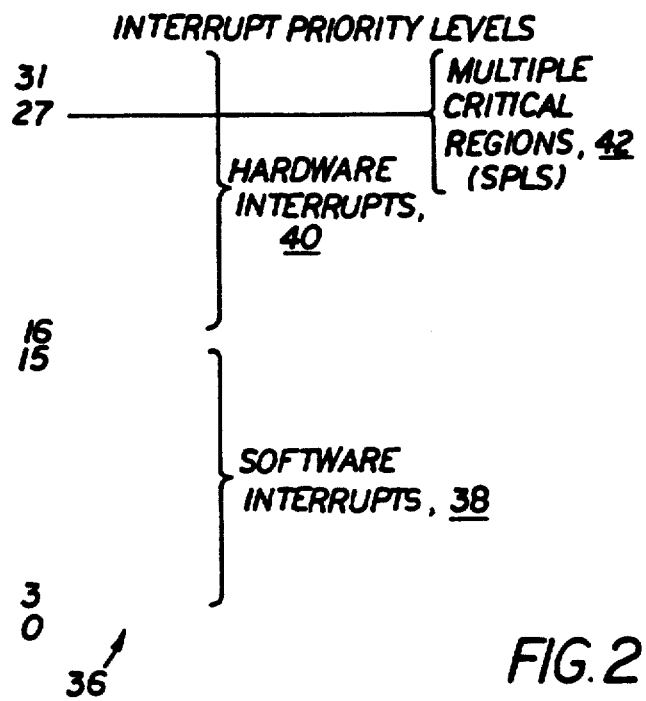
FIG. 2 is a chart of interrupt priority levels.

Referring to FIG. 2, in the VAX, there are 32 possible interrupt priority levels 36. The lower sixteen levels are software interrupts 38, while the upper sixteen levels are hardware interrupts 40 which, for example, involve service requests from application programs. When a processor responds to an interrupt at level 3 or higher, the context switching requires saving only the program counter (PC) and the program status long word (PSL). On the other hand, responding to an interrupt task below level 3 requires all registers to be saved.

There may be a number of critical regions 42 at a given interrupt priority level, e.g., level 27. In the synchronization priority table, the SPL field for a given entry is set to the interrupt priority level of the corresponding critical region.

Referring again to FIG. 1, each processor includes a hardware register 44 that holds an SPL value for that processor. A processor may not execute any task whose interrupt priority level is lower than its current SPL.

OPERATION

When a processor is about to enter a critical region, it is directed to execute the semaphore routine 26.

Figure 3:
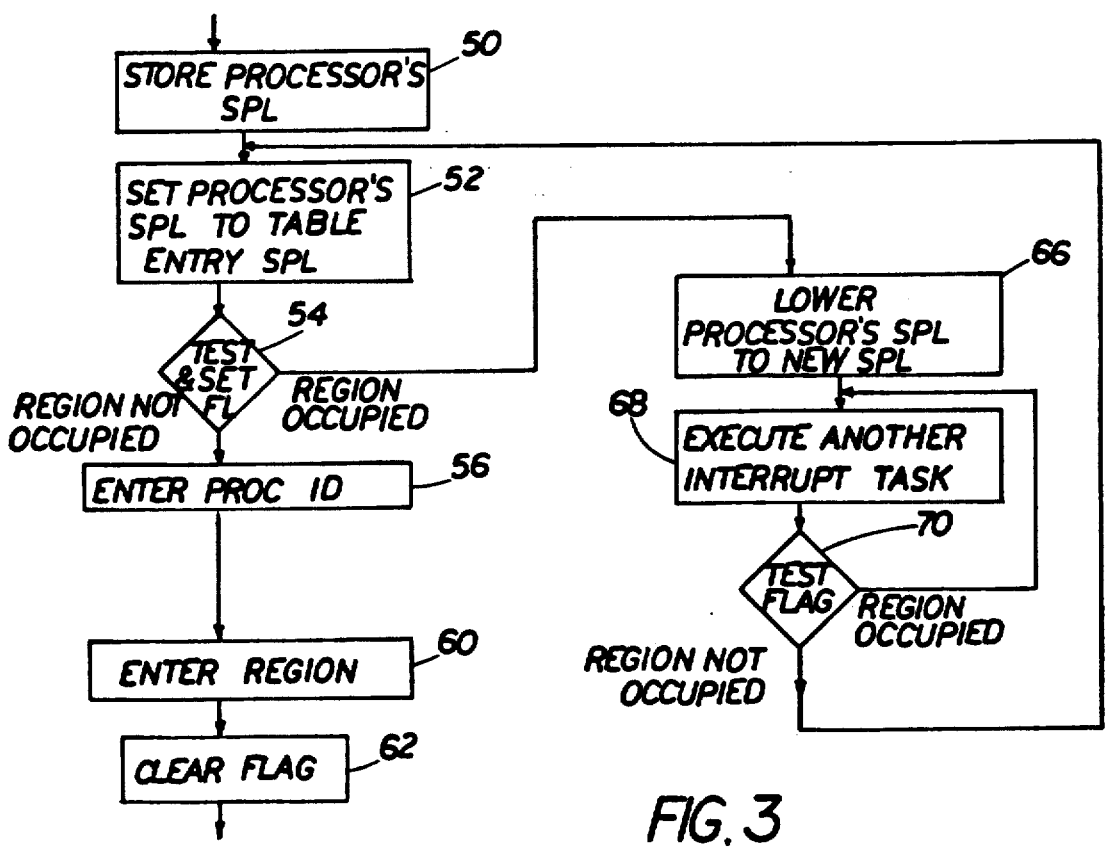
FIG. 3 is a flow chart of adjusting the minimum interrupt priority level for a processor.

Referring to FIG. 3, the semaphore routine first stores (50) the processor's SPL, and then consults the synchronization priority table entry 28 corresponding to the critical region and sets (52) the processor's SPL to the interrupt priority level found in the SPL field of the table entry. The semaphore routine then tests and sets (54) the flag field. If the flag was not previously set, then the critical region was not occupied and is now available only to this processor. The processor's ID is then entered (56) in the PROC ID field, and the processor is directed to enter the critical region (60). At the end of the critical region, the flag is cleared (62), making the critical region potentially available to other processors.

If, on the other hand, the semaphore routine finds the region occupied, it lowers (66) the SPL of the processor to a new SPL which is the greater of 3 or the processor's original SPL (the one stored in step 50). The processor is then free to respond to interrupts of tasks whose interrupt priority levels are higher than the new SPL, even though (potentially) lower than the critical region. After executing (68) each interrupt task, the processor returns to the semaphore routine, which proceeds to again test the flag (70). If the critical region remains occupied, the processor is again free to execute (68) another interrupt task. Otherwise, the semaphore routine restores (52) the processor's SPL to the table entry SPL and proceeds to step 54.

Lowering the SPL of the processor enlarges the supply of possible tasks that it is allowed to execute, instead of limiting the supply to tasks whose interrupt priority levels are higher than the SPL of the critical region, but without incurring the large overhead costs of context switching for tasks at interrupt priority level 2 or lower.

Not lowering the SPL below its original value assures that the processor is not diverted to service tasks at priority levels lower than the level the processor had been committed to prior to reaching the critical region.

Other embodiments are within the following claims. For example, other schemes may be used to determine the priority level to which the processor SPL is lowered when the processor is blocked.

We claim:

1. A method for determining alternative tasks which a processor may execute when its work on a task has been temporarily blocked by a conflict with another processor, comprising assigning each task a priority level, maintaining a current priority value for each processor indicating the lowest priority level of tasks which the processor is permitted to execute, updating the current priority value of a processor from a previous priority value to a new priority value that corresponds with its execution of a new task, and when the processor has been temporarily blocked from executing the new task because of a conflict with another processor, temporarily updating the current priority value of the blocked processor from the new priority value to a temporary priority value that is lower than the new priority value but no lower than the previous priority value, whereby the processor, while the conflict exists, may execute only those alternative tasks having priority levels which are no lower than the previous priority value.

2. The method of claim 1 wherein said conflict arises when one processor is blocked from entering a critical region of code in which the other processor is working.

3. The method of claim 2 wherein the current priority value of the blocked processor is temporarily updated to a value that is the greater of the previous priority value and a predetermined value.

4. The method of claim 3 further comprising determining said predetermined priority value based on the context switching overhead required of tasks having different priority values.

5. The method of claim 2 wherein the critical region of code has a priority value that is above the priority value of the blocked processor before the blocking, and the priority value of the blocked processor is temporarily updated to a value that is lower than the priority value of the critical region of code.

6. Apparatus for determining alternative tasks which a processor may execute when its work on a task has been temporarily blocked by a conflict with another processor, comprising means for assigning each task a priority level, means for maintaining a current priority value for each processor indicating the lowest priority level of tasks which the processor is permitted to execute, means, connected to the means for maintaining, for updating the current priority value of a processor from a previous priority value to a new priority value that corresponds with its execution of a new task, and for updating the current priority value of a processor when the processor has been temporarily blocked from executing a new task because of a conflict with another processor, the current priority value being updated from the new priority value to a temporary priority value that is lower than the new priority value but no lower than the previous priority value, whereby the processor, while the conflict exists, may execute only those alternative tasks having priority levels which are no lower than the previous priority value.

7. The apparatus of claim 6 wherein said means for updating includes means for temporarily updating the current priority value of the blocked processor to be temporarily updated to a value that is the greater of the new priority value and a predetermined value.

* * * * *